United States Patent [19]

Armbruster

[11] Patent Number: 5,289,605
[45] Date of Patent: Mar. 1, 1994

[54] DC POWERED SCRUBBER

[76] Inventor: Joseph M. Armbruster, 4700 N.E. 47th St., Lighthouse Point, Fla. 33064

[21] Appl. No.: 804,581

[22] Filed: Dec. 10, 1991

[51] Int. Cl.$^5$ ............... B60S 3/06; A47L 11/282; A47L 11/38
[52] U.S. Cl. ........................ 15/97.1; 15/28; 15/49.1; 15/144.4; 15/145; 15/180; 15/230.14; 15/230.16; 51/170 T; 464/36
[58] Field of Search ......... 15/28, 29, 97.1, 23, 15/24, 49.1, 230.14, 230.16, 144.4, 145; 51/170 T, 177

[56] References Cited

U.S. PATENT DOCUMENTS

| | | | |
|---|---|---|---|
| 2,782,452 | 2/1957 | Kitto et al. | 15/49.1 |
| 3,164,855 | 1/1965 | Hencken | 15/230.14 |
| 3,688,139 | 8/1972 | Yaguchi | 15/29 |
| 4,045,836 | 9/1977 | Glenn | 15/97.1 |
| 4,188,682 | 2/1980 | Burglin et al. | 15/97.1 |
| 4,202,068 | 5/1980 | Lester et al. | 15/28 |
| 4,399,578 | 8/1983 | Bordeaux | 15/97.1 |
| 4,724,567 | 2/1988 | Rones | 15/230.16 |

*Primary Examiner*—Edward L. Roberts
*Attorney, Agent, or Firm*—Jacobson, Price, Holman & Stern

[57] ABSTRACT

A cleaning apparatus in the form of a scrubber that is motor driven by a direct current (DC) motor driving a rotatable scrubber unit which includes a scrubber disc with the motor and scrubber disc forming a power head supported from a detachable and adjustable length pole which enables surfaces that are normally out of reach to be easily scrubbed. The scrubber disc incorporates a unique pad structure driven through a unique clutch structure with the power head being supported from the pole and connected with a source of DC electric power through a unique, dependable and longlasting electrical conductor arrangement. Interchangeable scrubber discs are utilized and the scrubber may be powered by a 12 volt DC motor connected to a portable 12 volt battery which may be supported as a backpack or the like, a 12 volt AC/DC transformer, plugged directly into a cigarette lighter on a vehicle or a vehicle battery or to any other source of 12 volt DC electrical power to supply the motor with electrical power to enable the motor to rotate the scrubber disc with adequate torque for scrubbing various surfaces.

14 Claims, 4 Drawing Sheets

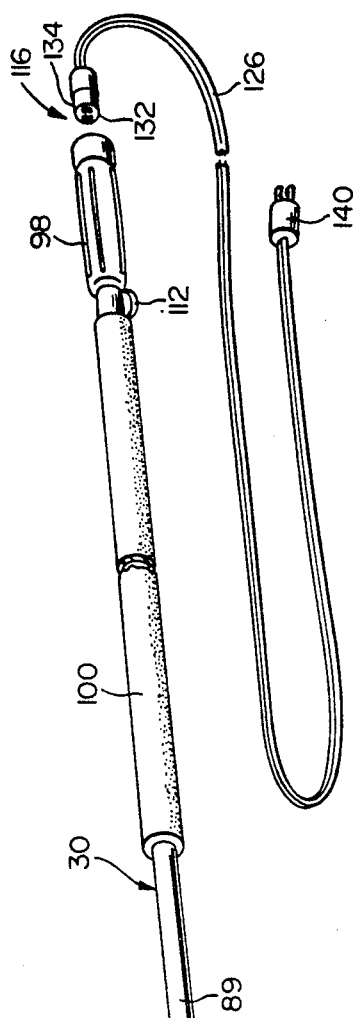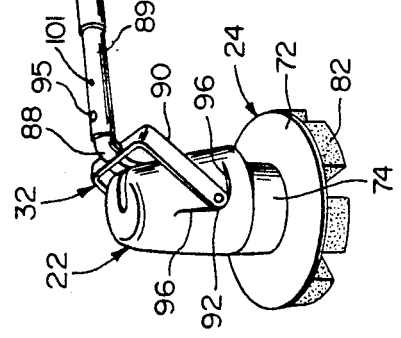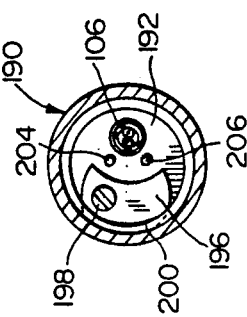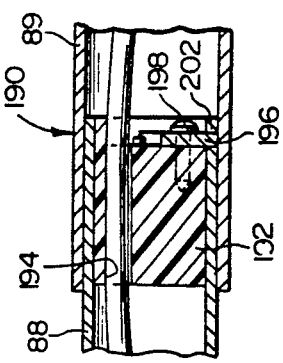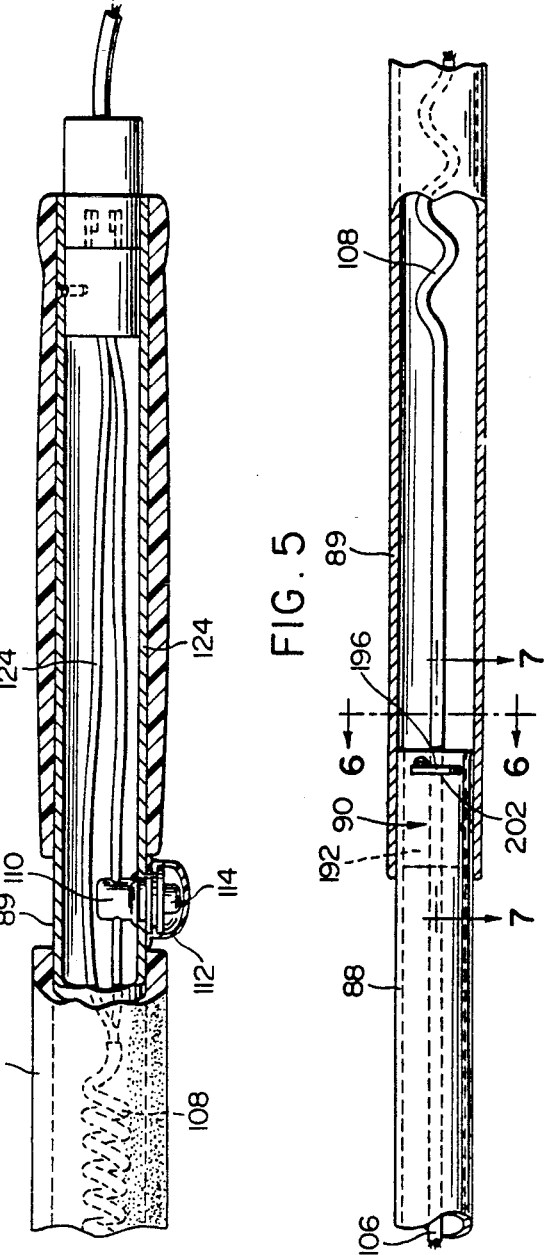

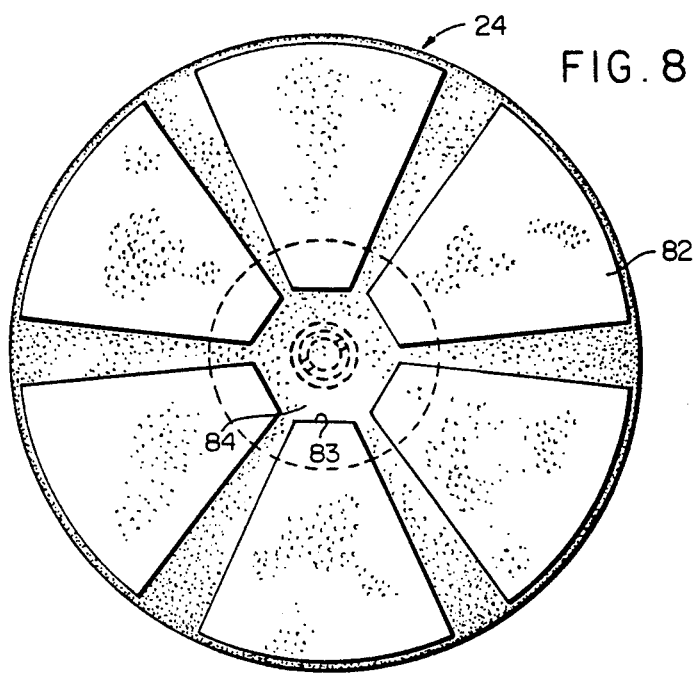
FIG. 8
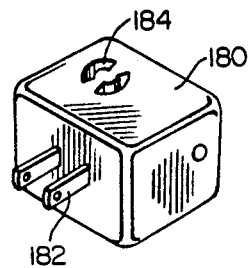
FIG. 13
FIG. 9
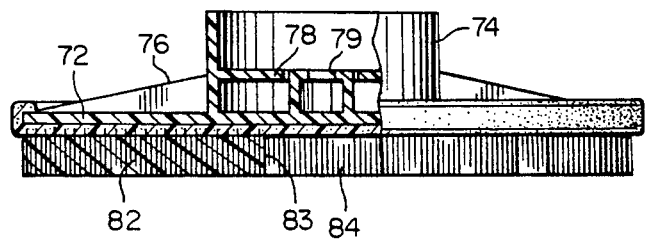
FIG. 10
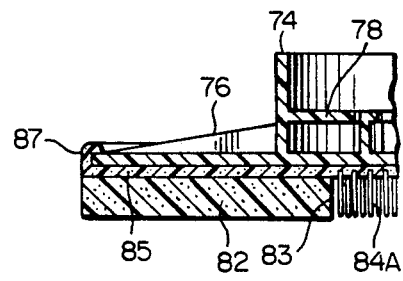
FIG. 11
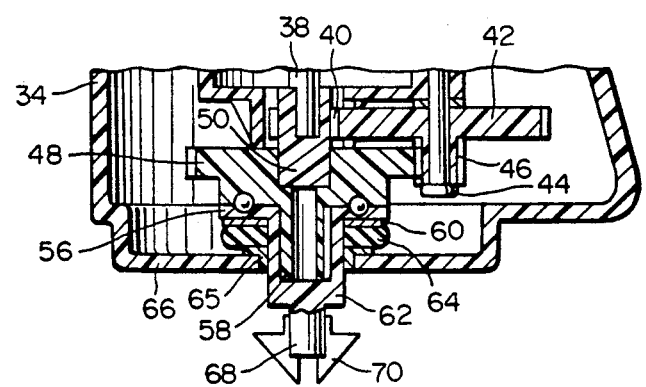
FIG. 12
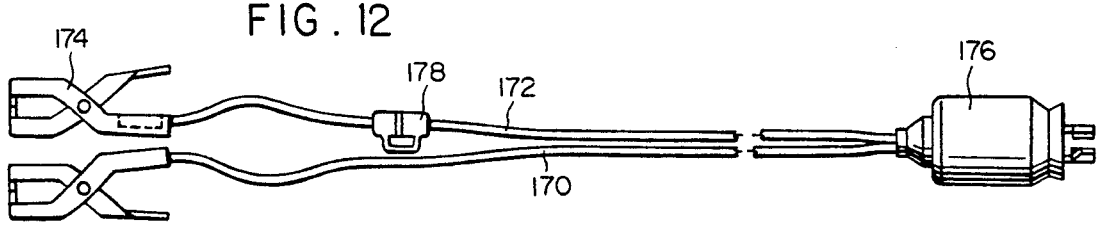

DC POWERED SCRUBBER

BACKGROUND OF THE INVENTION

1. Field of the Invention

The present invention generally relates to a cleaning apparatus in the form of a scrubber that is motor driven by a direct current (DC) motor driving a rotatable scrubber unit which includes a scrubber disc with the motor and scrubber disc forming a power head supported from a detachable and adjustable length pole which enables surfaces that are normally out of reach to be easily scrubbed. The scrubber disc incorporates a unique pad structure driven through a unique clutch structure with the power head being supported from the pole and connected with a source of DC electric power through a unique, dependable and longlasting electrical conductor arrangement. Interchangeable scrubber discs are utilized and the scrubber may be powered by a 12 volt DC motor connected to a portable 12 volt battery which may be supported as a backpack or the like, a 12 volt AC/DC transformer, plugged directly into a cigarette lighter on a vehicle or a vehicle battery or to any other source of 12 volt DC electrical power to supply the motor with electrical power to enable the motor to rotate the scrubber disc with adequate torque for scrubbing various surfaces.

2. Description of the Prior Art

Cleaning apparatuses having a rotary scrub brush or brushes driven by an electric motor are well known with such devices frequently being connected to a 120 volt AC electrical source. Usually, a relatively short handle is pivotally connected to a motor housing with an electrical conductor extending along the handle and connected to the motor. While such devices function adequately when cleaning floor surfaces or similar horizontal surfaces, they are usually equipped with stiff bristles and quite heavy and not suitable for cleaning plastic surfaces with gel coat since the brush bristles will scratch the surface. Also, heavy conventional scrub devices are not capable of effectively cleaning hard to reach or out of reach surfaces such as vertical surfaces, elevated surfaces, inclined surfaces and the like. Also, such devices cannot be safely used in areas or on surfaces in which water may be used in cleaning the surface such as external surfaces including but not limited to buildings or vehicles such as vans, aircraft, boats and the like. Also, water powered scrubbing apparatuses are known which eliminate shock hazard but water driven motors produce a very low output torque which in many instances is inadequate to power an effective scrubbing unit.

The prior art does not disclose a DC powered scrubber of lightweight construction mounted at the outer end of a manually manipulated adjustable pole which may be adjusted from a length of approximately 4 ft. to a length of approximately 8 to 12 ft. to enable the scrubber to be used in cleaning hard to reach or out of reach surfaces such as those encountered on vehicles such as vans, aircraft, trucks and on boats which have elevated and inclined surfaces which are difficult to reach with conventional cleaning apparatuses and procedures.

SUMMARY OF THE INVENTION

An object of the present invention is to provide a scrubber including a power head mounted at the outer end of a telescopic handle in the form of a pole with the power head including a relatively lightweight, high torque DC motor drivingly engaged with a scrubber disc through a gear head and clutch arrangement with the scrubber disc being detachably mounted for interchange with various types of scrubber discs with the pole being sufficiently long to enable surfaces that are normally hard to reach or completely out of reach to be accessed for cleaning by the scrubber which can be manually manipulated along various surfaces including vertical surfaces, inclined surfaces and the like.

Another object of the invention is to provide a DC powered scrubber in accordance with the preceding object in which the scrubber and elongated pole handle include a unique connecting structure enabling effective relative pivotal movement between the power head and handle while maintaining an electrical conductor supplying electrical energy to the motor from a power source in the form of a 12 volt DC power supply.

A further object of the invention is to provide a scrubber in accordance with the preceding objects in which the scrubber disc includes a rubber or plastic backing with attachable scrubbing components of particular materials, shapes and configurations for effectively cleaning various surfaces under various conditions.

Still another object of the invention is to provide a scrubber in accordance with the preceding objects in which the motor output shaft is provided with a unique clutch assembly to maintain a driving connection between the motor and the scrubber disc which is released when the torque being transmitted exceeds a predetermined maximum while maintaining the integrity of the gear head drive unit.

A still further object of the invention is to provide a scrubber or other powered implement which includes a detachable telescopic handle which can be used to support and supply power to various powered implements.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 3 is a perspective view of the DC powered scrubber.

FIG. 4 is a longitudinal, vertical sectional view, on an enlarged scale of the handgrip portion of the scrubber.

FIG. 5 is a detailed sectional view of the telescopic pole illustrating the construction of the telescopic joint.

FIG. 6 is a transverse, sectional view taken along section line 6—6 on FIG. 5 illustrating the locking structure for the telescopic joint in the pole.

FIG. 7 is a detailed sectional view taken substantially upon a plane passing along section line 7—7 on FIG. 5 illustrating further structural details of the telescopic lock and conductor passageway.

FIG. 8 is a bottom plan view of the scrubber disc.

FIG. 9 is a side elevational view of the scrubber disc of FIG. 8 with portions in section to illustrate the structural details.

FIG. 10 is a detailed sectional view of a portion of another scrubber disc.

FIG. 11 is a sectional view of the clutch assembly between the motor and scrubber disc.

FIG. 12 is a fragmental view of the structure to connect the scrubber to a battery.

FIG. 13 is a perspective view of a transformer which may be used to power the scrubber.

DESCRIPTION OF THE PREFERRED EMBODIMENTS

Figure 1:
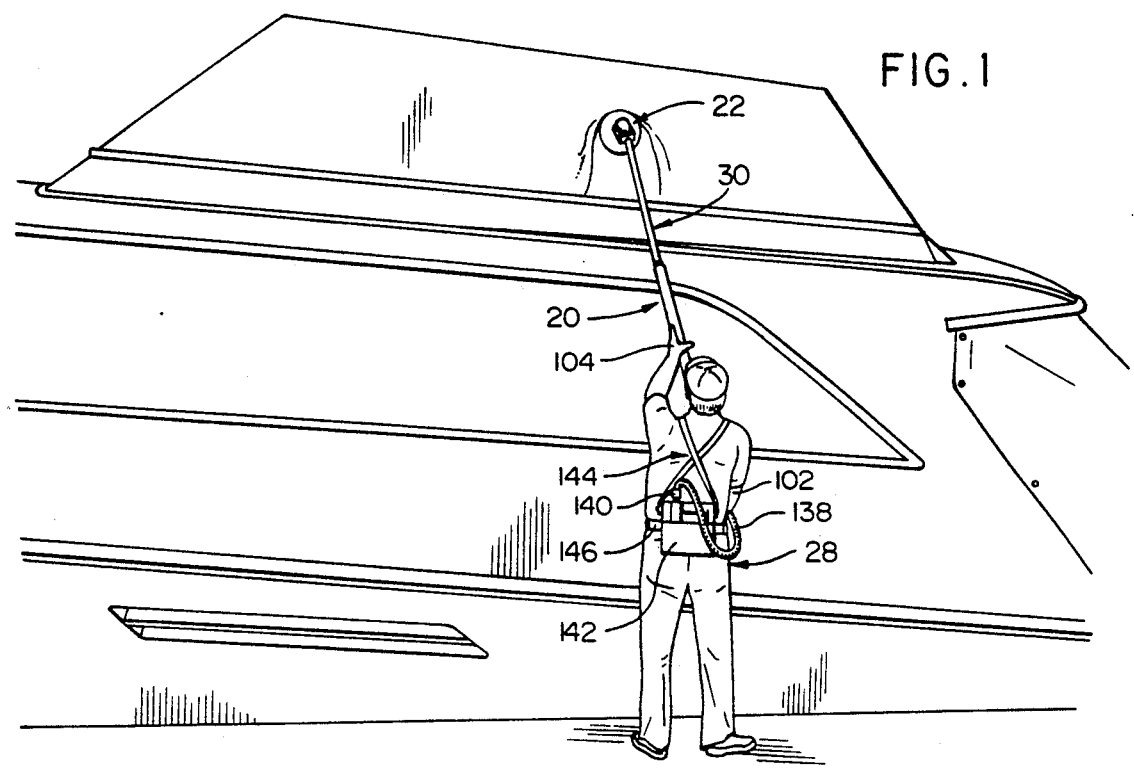
FIG. 1 is a perspective view of one embodiment of the DC powered scrubber of the present invention.

Referring now specifically to the drawings, the DC powered scrubber of the present invention is generally designated by reference numeral 20 and includes a power head generally designated by reference numeral 22, a scrubber unit generally designated by reference numeral 24 driven by the power head 22 through a clutch assembly generally designated by reference numeral 26. The scrubber is manipulated and controlled by a user generally designated by reference numeral 28 through an elongated telescopic handle assembly 30 that is connected to the power head by a pivotal yoke connection 32. The structure of the device is relatively lightweight so that the user 28 can easily manipulate the scrubber for scrubbing vertical, inclined, overhead as well as horizontal surfaces with the telescopic handle assembly 30 enabling the scrubber to be used in cleaning hard to reach or normally out of reach surface areas.

The power head 22 includes a motor housing 34 which may be constructed of molded plastic, metal or the like and oriented within the housing 34 is a DC motor 36 secured within the housing in any suitable manner. The motor 36 includes an output shaft 38 having a small pinion gear 40 thereon in meshing engagement with a larger gear 42 which has a shaft 44 provided with a small pinion drive gear 46 thereon that is in meshing engagement with a larger gear 48 which has a center of rotation in alignment with the shaft 38. A pilot shaft 50 extending from gear 40 extends into the gear 48 to rotatably support the gear 48.

The clutch assembly 26 includes a plurality of generally semi-spherical recesses 52 in an extending cylindrical projection 53 on the face of the gear 48 with the recesses being axially extending and circumferentially spaced to partially receive a plurality of correspondingly shaped projections or spherical balls or detents 54 which are received partially in recesses 55 in the opposed face of a clutch plate 56 which is journaled on a pilot shaft 58 extending from the gear 48. The clutch plate 56 has a disc washer 60 mounted on a pilot shaft 62 extending from the clutch plate 56 and a toroidal or donut-shaped member 64 is interposed between the washer 60 and a seal 65 which engages the lower end 66 of the housing. The member 64 is constructed of resilient material such as rubber which is capable of being compressed in the event the scrubber unit is prevented from rotating when the motor 36 is energized which enables the spherical balls or detents 54 along with the plate 56 to move axially on the pilot shaft 58 thus releasing the drive connection between the gear 48 and the clutch plate 56. The gears 40, 42, 46, 48, pilot shafts 44, 50, 58, 62, extension 53, plate 56 and ball detents 54 are preferably constructed of a plastic material such as nylon or the like thereby providing a relatively inexpensive but yet dependable release clutch to prevent the plastic gears from stripping when the motor is activated and the scrubber unit 24 cannot rotate. The donut-shaped rubber member 64 also is associated with the pilot shaft 62 where it extends through the bottom end 66 of the housing 34 to provide an additional seal to prevent entry of moisture or water into the motor housing. The end of the shaft 62 includes a connecting structure for detachably connecting the scrubber unit 24 to the shaft 62. The connection between the scrubber unit 24 and the shaft 62 includes a reduced drive shaft 68 on the end of the shaft 62 on the plate 56 and a pair of triangular resilient retainers 70 integral therewith.

Figure 2:
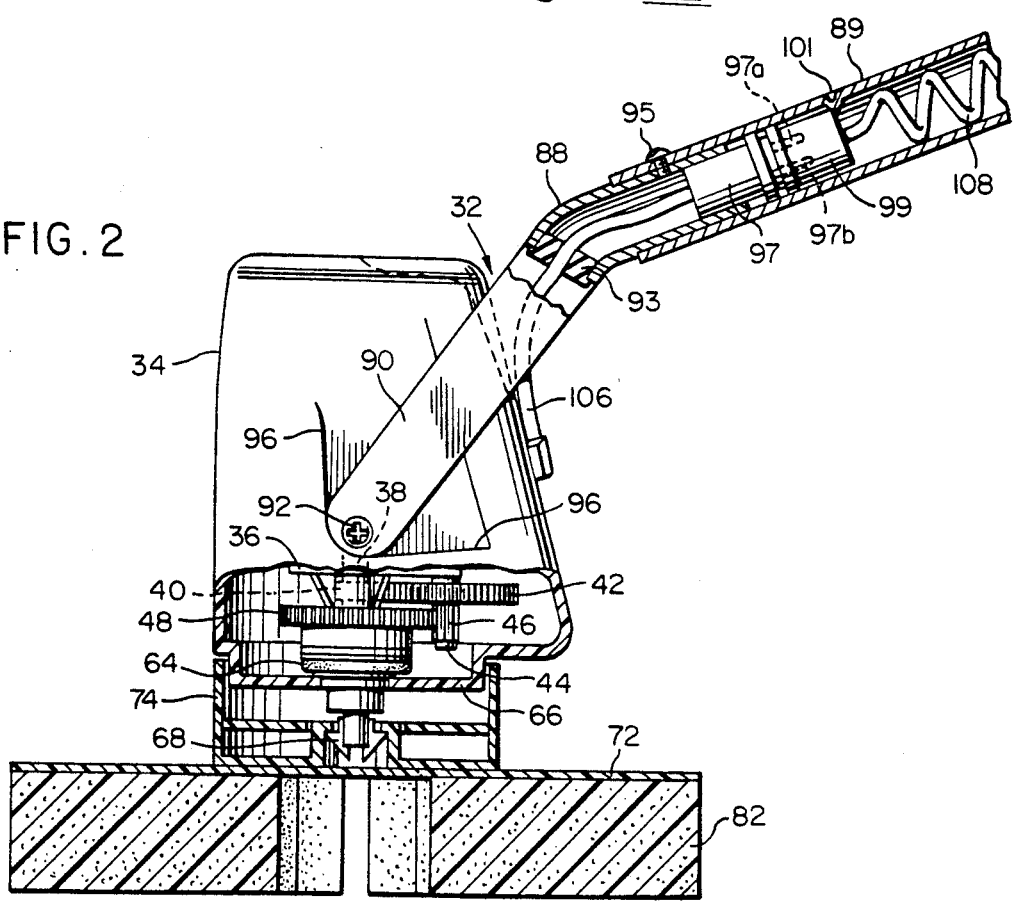
FIG. 2 is a side elevational view of the power head illustrating, in section, the construction of a scrubber disc and hub and the separable telescopic power supplying handle connection.
Figure 14:
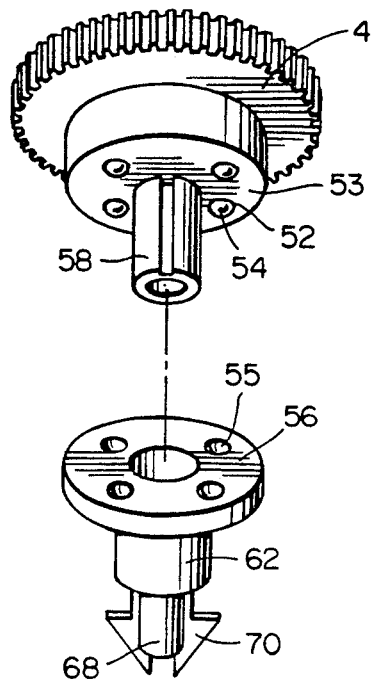
FIG. 14 is an exploded perspective view of the clutch components.

The scrubber unit 24 includes a generally circular disc 72 of rubber or plastic having some degree of resiliency but being substantially semi-rigid in construction with one surface of the disc having a cylindrical extension 74 rigid with the center thereof which extends toward and generally telescopically relates to the lower end portion of the housing 34 as illustrated in FIG. 2. The disc 72 includes a plurality of optional reinforcing gussets 76 extending from the cylindrical extension 74 and tapering outwardly to reinforce and rigidify the disc. Centrally of the cylindrical extension 74, the disc 72 includes a connector plate 78 which has a notched aperture 79 structured for locking engagement with the retainers 70 on the clutch assembly 26. Attached to the outer surface of the disc 72 is a plurality of triangular or pie-shaped truncated segments 82 of sponge or foam material such as that available commercially under the trademark "Scotch-Brite" distributed by 3M Company. The segments of the cleaning spongelike material 82 have inner ends 83 which terminate in spaced relation to provide an open center 84 for the cleaning pad formed by the sponge segments 82. The sponge segments 82 are secured to the disc 72 by an adhesive bonding 86 or by any other secure fastening mean-s which enables the scrubber unit to be economically manufactured. As shown in FIGS. 9 and 10, the sponge segments 82 can be mounted on a backing member 85 which can be bonded to the disc 72 with the backing member 85 having a wrap around edge 87 of cushioning material to protect areas which might be contacted by the periphery of the disc 72. FIG. 10 illustrates an option of having brush bristles 84A in the open center 84.

The handle assembly 30 includes an inner tubular handle member 88 and one or more outer tubular handle members 89 which are telescopically related to each other and the end tubular member 89 being telescoped over and detachably connected to the inner tubular member 88 which is connected to the power head 22 through the yoke connection 32. The yoke connection 32 includes a U-shaped yoke 90 connected to opposite sides of the housing by pivot bolt structures 92 with the tubular member 88 being rigidly affixed to the center thereof with a rubber grommet seal and cord retainer 93 holding the cord 106 in the tube 88. The housing includes a pair of outwardly projecting stop members 96 in the form of integral formed projections on the housing positioned to limit the pivotal movement of the yoke 90 in relation to the housing 34 with the power head thus being freely pivotal about an axis defined by the pivot bolts or pins 92 within the limits defined by the stop members 96 thus enabling the angular orientation of the handle assembly 30 to the power head 22 to be varied so that the scrubber unit 24 can engage horizontal surfaces, inclined surfaces, vertical surfaces or overhead surfaces with the handle assembly 30 being maintained in a position for easy gripping and control by the user 28.

The handle assembly 30 is detachable from power head 22 by a telescopic joint between inner tube 88 and outer tube 89 with a machine screw 95 retaining tube 89 in place against a shoulder on tube 88. A male plug 97 is positioned in the end of the tube 88 and is connected to cord 106 with a large and small pin 97a and 97b projecting therefrom to be received in similar sockets in a female plug or receptacle 99 frictionally held in tube 89 and inserted therein until it engages a limit dimple 101. The female plug 99 can be pulled out of the tube 89 by the use of a pair of needle nose pliers and connected to the male plug 97 and the female plug can be inserted back into the tube 89 as it is telescoped over the tube 88. Movement of the female plug 99 is permitted by the coiled or zig-zag power cord segment 108 in tubes 89. The male plug 97 may be provided with a peripheral rib or flange to limit its insertion into tube 88 or it may bottom out against the cord retainer 93. This structure enables the handle assembly 30 to be used with other powered devices.

The outer end of the outermost handle section 89 is provided with a handgrip 98 in the form of a tubular sleeve and a tubular foam member 100 encloses a substantial length of the outermost tubular member 89. The handgrip 98 and the foam sleeve 100 may be distinguishably colored to enable accurate control of the scrubber by the user grasping the handgrip 98 with one hand 102 and the foam rubber covering 100 with the other hand 104 with the hands thus being spaced apart to enable the scrubber to be controlled and manipulated in an easy and effective manner thus enabling the scrubber to be used for long periods of time by the user without excessive fatigue.

As illustrated, the power cord 106 is connected to the motor and extends out from the housing 34 as illustrated in FIG. 2 with the cord then extending through the grommet 93 into the tubular handle member 88 of the handle assembly 30 and connected to male plug 97. The housing 34 includes a groove or recess 107 to receive the cord 106 when the handle assembly 30 is pivoted so that yoke 90 is generally parallel to the longitudinal axis of motor housing 34. The cord 106 includes a spirally wound segment or wavy segment 108 therein to enable longitudinal adjustment of the tubular members 89 in relation to each other to enable longitudinal adjustment of the handle between retracted and extended positions thus enabling the scrubber unit to reach surfaces not normally accessible with the handle assembly being adjustable from a length of approximately 3 to 4 ft. to an overall length of 8 to 12 ft. These dimensions may vary depending upon the particular requirements that are encountered. A push-on, push-off switch 110 is mounted in the tubular member 89 adjacent the inner end of the handgrip 98 with a flexible rubber cover 112 being provided for the switch actuator 114 to prevent the switch and contacts coming into contact with water during normal use of the scrubber.

The end of the tubular member 89 having the handgrip 98 thereon is provided with a detachable electrical connection generally designated by reference numeral 116 which includes a cylindrical male plug 118 recessed into the end of tubular member 89 and secured therein by a screw 120. The plug 118 includes a pair of male prongs 122 which are electrically connected to the pair of conductors 124 extending through the end of the tubular member 89 having the switch 110 therein. A power supply cord 126 has a female plug 130 on the end thereof provided with a projecting cylindrical plug portion 132 which telescopes into the end of the tubular member 89 with the cylindrical portion 132 having a pair of sockets 134 in electrical contact with the male blades 122 to electrically connect the conductors 124 to the cord 126. The plug 130 includes a resilient sleeve 136 which engages the end of the tubular member 89 and limits the insertion thereof and forms a waterproof cover for plug connection 116 with the remainder of the plug 130 forming a handle to enable the cord 126 to be connected and disconnected from the conductors 124 through the connector 116. The blades 122 and sockets 134 are of twist lock configuration in which the blades and sockets are arcuate about the center of the plug with the blades being inserted into the sockets and twisted a partial revolution to lock the male plug 118 and female plug or socket 130 in detachable locked connection. The cord 126 may take various configurations including a spirally wound cord portion 138 having a male plug 140 on the end thereof which is adapted to be connected with battery 142 such as a 12 volt rechargeable battery pack which is supported at the back of a user 28 by the use of a harness 144. The harness 144 includes a waist encircling belt 146 having a front buckle 148 to enable adjustment of the belt. A pair of crossed, adjustable shoulder straps 150 connected at one end to the battery 142 at the rear of the user and provided with keyhole slots 154 at their front ends for detachable connection to a headed stud 156 projecting from the front of the buckle 148. This structure facilitates support of the battery and enables the user to easily don and remove the harness. The rear ends of the straps 150 have keyhole slots 152 which engage headed studs 158 on each end of the battery 142 which also includes rigid belt loops 160 which receives the belt 146 to secure the battery in position alongside the lower back area of the user 28.

Figure 15:
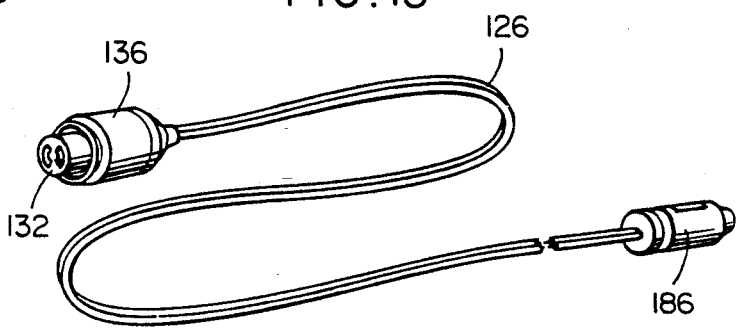
FIG. 15 is a perspective view of a structure to connect the scrubber to a cigarette lighter in a vehicle.
Figure 16:
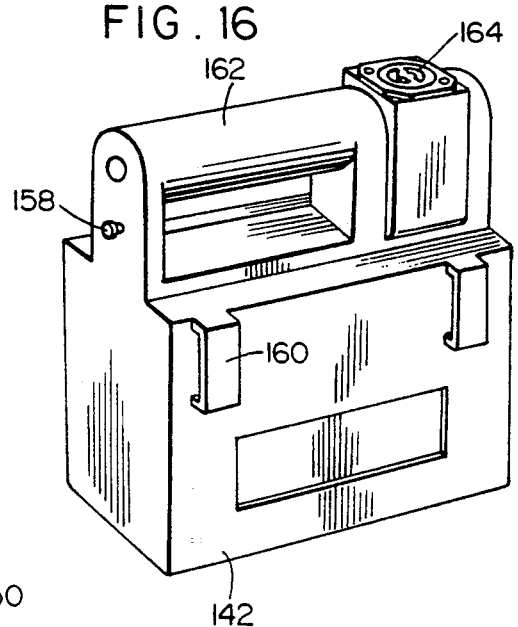
FIG. 16 is a perspective of a battery to power the scrubber.
Figure 17:
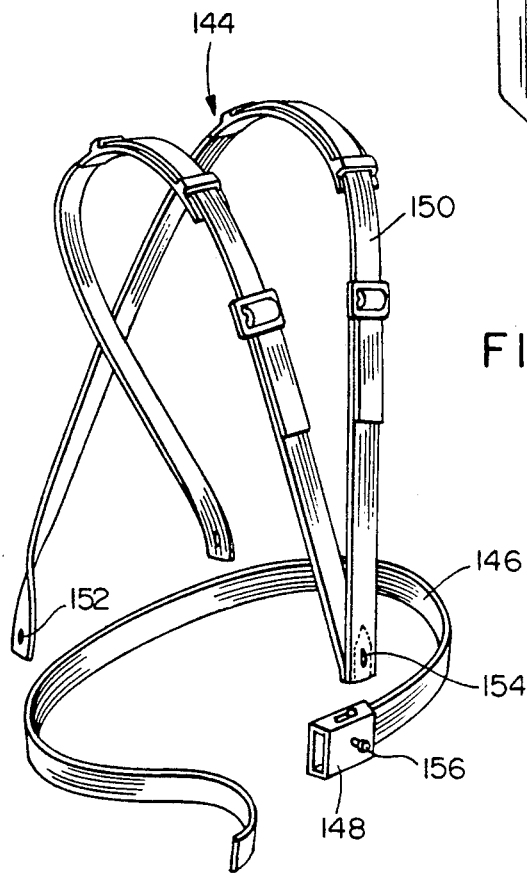
FIG. 17 is a perspective view of the harness to support the battery from a person using the scrubber.

The battery 142 also includes a handle 162 rigid above the top thereof with one end thereof including an upwardly facing female twist lock plug or socket 164 to receive and lockingly engage the male twist lock plug 140 on cord 126 as shown in FIG. 1. As indicated in FIG. 1, the cord 126 can be spirally coiled at 138 to enable the scrubber unit to be moved while the cord 126 remains out of the way. FIG. 3 illustrates the cord 126 in an elongated straight condition which enables the plug 140 to be connected to a battery placed on a dock, driveway or other stationary position when using the scrubber without the harness being used to support the battery from the user. In another embodiment of the invention as shown in FIG. 12, the cord is in the form of a pair of conductors 170 and 172 each of which is provided with a clamp 174 on the free end thereof for connection with the terminal posts of a vehicle battery, battery clamps or other connection with a 12 volt energy source. A male twist lock plug 176 is connected to the other end of conductors 170 and 172. A fuse 178 is provided in the conductor 172 or in the handle of one of the clamp members 174. Another power source as illustrated in FIG. 13 is a 12 volt transformer 180 having male connector pins or blades 182 and a female twist lock plug or socket 184 for connection with the plug 140 on the cord 126. Both the battery and transformer are commercially available items and may take any form and configuration with the various power sources providing a 12 volt DC electrical source to the scrubber 20. FIG. 15 illustrates an adaptor 186 on cord 126 which can be inserted into a cigarette lighter socket provided on many vehicles to provide electrical energy to the scrubber from the vehicle battery.

The tubular members 89 are telescopically engaged and are locked securely in adjusted position by a lock structure generally designated by reference numeral 190 which is locked and unlocked by relative rotation between the tubular members 89. FIGS. 5, 6 and 7 illustrate the specific details of this structure including a plug 192 rigidly affixed to the interior of the end of an inner tubular member 89 received in an outer tubular member 89. The plug 192 includes an off center passageway 194 for the electrical cord 106 that is connected to the motor 36 and extends to the switch 110. A cam member 196 is pivotally mounted on the outer face of the plug 192 by a pivot screw 198 and includes cam surface 200 which lockingly, contacts the internal surface of the outer tubular member 89 through an opening 202 in the portion of the inner tubular member 89 which projects beyond the plug 192 as illustrated in FIGS. 6 and 7. Stop pins 204 and 206 are provided for the cam member 196 to retain the cam member in frictional engagement with the outer member 89 when the outer tubular member 89 is twisted in relation to the inner tubular member 89. When the tubular members 89 are in a neutral position, they can be moved telescopically but when they are rotated in relation to each other in either direction, the cam member 196 will be forced into locking contact with the internal surface of the outer tubular member 89 thus locking the tubular members 89 in adjusted position.

With the scrubber as defined, the electrical source may be a 12 volt battery, a 12 volt AC/DC transformer, a male plug plugged directly into a cigarette lighter socket such as found conventionally in various automobiles and other similar vehicles thus allowing the scrubber to be connected to the battery of the vehicle being scrubbed. The scrubber may be connected directly to a vehicle battery through the fused cord and clamp assembly. A power cord of any length may be used to supply the electrical energy to the scrubber and may be connected to a battery or may be connected to a deck plate with a twist lock 12 volt socket mounted interiorly or exteriorly of a building structure such as on a dock or in a boat in order to supply DC power. The 12 volt battery or the transformer may have an adapter that will receive a conventional cigarette lighter plug thus simplifying the supply of electrical energy to the scrubber. The battery can be placed near the work being done or attached to the belt/shoulder harness as illustrated. Thus, various 12 volt DC electrical sources may be used and may be connected to the scrubber by various conventional procedures with the power supply cord being detachable at the end of the handle assembly 30.

The yoke connection 32 between the handle assembly 30 and the power head 22 provides a lightweight construction and eliminates the necessity of locking devices to lock the angular relation between the handle assembly and power head. The coiled wire inside the telescoping handle 30 has enough tension so that the cord 106 from the motor is always tensioned so that there is no excess loop of wire between the handle assembly and the motor housing. The complete handle assembly may have a length such as 8 ft., 12 ft. or the like and may be 2, 3 or more sections having telescopic twist lock structures. The foam tube sleeve 100 may be black and and the handqrip 98 white which enables an operator or user to grip and control the unit with greater ease and comfort. The handle grip 98 provides the user or operator with a firm grasp on the handle with the on/off switch actuator 114 being immediately accessible to the thumb of the hand gripping the handgrip.

The yoke structure and the stop members 96 which are located in front of and behind the yoke allows the motor housing to pivot approximately 15° to 30° above vertical and approximately the same degree of pivotal movement beyond the horizontal position. The disc with sponges thereon may typically be 6" in diameter with the disc being plastic injection molded with interchangeable discs including brush bristle or a combination of sponge and brush bristles. The retainers 70 are in the form of spring loaded J-hooks securing the disc to the clutch output shaft with the diametrically opposed J-hooks being simply pushed into the hub of the disc to secure the disc in place and merely being squeezed together by removal of the disc hub in relation to the clutch output shaft 62.

By using a 12 volt electrical source, the scrubber can be used under various environmental conditions and even in association with water. For example, a boat owner can actually be in the water and use the scrubbing device to scrub the entire boat hull from below the water line to the toe rail while in the water, in the boat or standing on the dock. Also, this enables the operator or user to scrub the entire super structure of the boat including horizontal surfaces, vertical surfaces, inclined surfaces and overhead surfaces.

The detachable handle assembly may be used with other types of hand manipulated work implements which can be AC or DC powered such as random orbit sanders, grinders, waxers, buffers, polishers, scrubbers and the like which have a rotary, reciprocating or other movement of the working implement. The quick disconnect pad structure enables different pads with bonnets mounted thereon to be used thereby eliminating the necessity of removing a used bonnet and applying a new bonnet of terrycloth or other material for each separate operation when cleaning, waxing and polishing a surface such as a vehicle in which separate panels of the vehicle are cleaned, waxed and polished independently. For example, each panel of a vehicle such as a van or automobile to be treated will use 3 applicator bonnets for cleaning, waxing and polishing and 3 buffer bonnets for the cleaning, waxing and polishing steps which requires 6 different bonnets to be attached to the pad. By using the quick connect/disconnect pad, the 6 bonnets can be attached to 6 pads for rapid change to save time by merely changing the pads with the bonnets thereon rather than replacing the bonnets on the pad at each step. The 6 pads with attached bonnets can be used for independently cleaning, waxing and polishing each of the vehicle panels in any sequence desired until the complete vehicle has been cleaned, waxed and polished.

The foregoing is considered as illustrative only of the principles of the invention. Further, since numerous modifications and changes will readily occur to those skilled in the art, it is not desired to limit the invention to the exact construction and operation shown and described, and, accordingly, all suitable modifications and equivalents may be resorted to, falling within the scope of the invention.

What is claimed as new is as follows:

1. A scrubber comprising a rotatable scrubber unit adapted to engage a surface to be scrubbed, a power head, means drivingly connecting the power head to the scrubber unit, handle means, means pivotally connecting the handle means to said power head, and means supplying electrical power to said power head, said powder head including an electric motor, said means supplying electrical power to the power head including means connecting the motor with a source of electric power to drive the scrubber unit with an operator of the scrubber manipulating and controlling the scrubber from said handle means, said means drivingly connecting the power head to the scrubber unit including an output shaft from the motor, a gear reduction assembly connected to the output shaft, said gear reduction assembly including an output shaft, clutch means incorporated into the output shaft of the reduction gear assembly with the clutch means including an output shaft connected to the scrubber unit, said clutch means including opposed clutch plates with one of the clutch plates being integral with the output shaft of the reduction ear assembly, said clutch plates including facing opposed surfaces with sad surface on one of said plates including a plurality of circumferential spaced recesses oriented in substantially equally spaced relation, the other of said plates including a plurality of circumferentially spaced recesses in the axial surface of the plate, a plurality of ball detents in engagement with the recesses, and resilient means biasing said clutch plates together to retain the clutch plates in driving relation but enabling one of the clutch plates to move axially and permit relative rotation of the clutch plates when a predetermined load through the clutch means has been exceeded.

2. The scrubber as defined in claim 1 wherein said recesses and ball detents are generally spherical in configuration and said clutch plates being constructed of plastic material.

3. The scrubber as defined in claim 1 wherein said means biasing the clutch plates includes an annular member of resilient material engaging one of said clutch plates and biasing it toward the other with the annular member also engaging a stationary component of the power head to enable the clutch plates to move axially away from each other to disengage the detents from the recesses in the event of torque transmission exceeding a predetermined load.

4. The scrubber as defined in claim 3 wherein said power head includes a housing enclosing the motor and clutch means with the stationary component engaging the resilient member including an end wall of said housing and a seal encircling the output shaft from the clutch means and engaging the end wall of the housing to seal the output shaft in relation to the housing.

5. The scrubber as defined in claim 1 wherein said scrubber unit includes a circular disc of resilient, semi-rigid material, a plurality of pie-shaped, circumferentially spaced sponge-type cleaning members mounted on said disc with the inner ends of the pie-shaped members being spaced to provide a hollow interior for the scrubber unit and means mounting the pie-shaped members on said disc.

6. The scrubber as defined in claim 1 wherein said handle means includes a pair of telescopic tubular members, means locking the telescopic tubular members in longitudinally adjusted position to vary the length of the handle assembly, the outer end of the outermost tubular member having a handgrip thereon and a portion of the tubular member inwardly of the handgrip having a foam material forming a cover for the tubular member to facilitate gripping and handling thereof.

7. The scrubber as defined in claim 6 together with means locking the tubular members in longitudinally adjusted position in response to relative twisting motion of one tubular member in relation to the other.

8. The scrubber as defined in claim 7 wherein said means supplying electrical energy to the power head including an electric cord assembly extending through the tubular handle members.

9. The scrubber as defined in claim 7 wherein said means locking the tubular members in longitudinally adjusted position includes a cam member mounted in one of said tubular members and engaging the interior of the other tubular members for locking the tubular members in response to relative rotation of one tubular member in relation to the other.

10. The scrubber as defined in claim 9 wherein said outer tubular member includes a manually operated switch mounted therein with an actuator positioned adjacent the handgrip on the handle means to enable control of the electrical circuit to the power head motor.

11. The scrubber as defined in claim 1 wherein said means to supply electrical energy to the scrubber unit includes a power cord having means on one end thereof for connection with a source of 12 volt DC electric power.

12. The scrubber as defined in claim 11 wherein said power cord includes a male/female twist lock detachable electrical connection at the outer end of the handle means.

13. The scrubber as defined in claim 1 wherein said handle means includes a manually operated switch mounted therein with an actuator positioned adjacent a handgrip on the handle means to enable control of the electrical circuit to the power head motor.

14. The scrubber as defined in claim 1 wherein said handle means and power head includes means detachably connecting the handle means and power supply means to said power head to enable the handle means to be used with other powered devices.

* * * * *